United States Patent
Rodrigues et al.

(10) Patent No.: US 10,996,541 B1
(45) Date of Patent: May 4, 2021

(54) NONLINEAR OPTICS ENABLED TRANSPARENT DISPLAY

(71) Applicant: Toyota Motor Engineering & Manufacturing North America, Inc., Plano, TX (US)

(72) Inventors: Sean P. Rodrigues, Ann Arbor, MI (US); Ercan M. Dede, Ann Arbor, MI (US)

(73) Assignee: Toyota Motor Engineering & Manufacturing North America, Inc., Plano, TX (US)

( * ) Notice: Subject to any disclaimer, the term of this patent is extended or adjusted under 35 U.S.C. 154(b) by 0 days.

(21) Appl. No.: 16/599,746

(22) Filed: Oct. 11, 2019

(51) Int. Cl.
*G02B 6/00* (2006.01)
*G02F 1/383* (2006.01)

(52) U.S. Cl.
CPC .......... *G02F 1/383* (2013.01); *G02F 2201/56* (2013.01)

(58) Field of Classification Search
CPC .......... G02F 1/383; G02F 1/353; G02F 1/395; G02F 2001/354; G02F 1/3532; G02F 2001/0113; G02F 2201/56; G02F 3/0448; H01S 5/0092
See application file for complete search history.

(56) References Cited

U.S. PATENT DOCUMENTS

| | | | | |
|---|---|---|---|---|
| 6,973,238 B2* | 12/2005 | Soda | ..................... | G02F 1/3133 385/16 |
| 7,592,988 B2* | 9/2009 | Katase | .................. | G02F 1/1326 345/84 |
| 8,081,851 B2 | 12/2011 | Koos et al. | | |
| 8,644,650 B2* | 2/2014 | Evans | ....................... | G02F 1/21 385/3 |
| 9,470,952 B2* | 10/2016 | Dagli | .................... | G02F 1/2255 |
| 9,740,034 B2 | 8/2017 | Woodgate et al. | | |
| 10,209,530 B2 | 2/2019 | Telfer et al. | | |
| 10,379,681 B2* | 8/2019 | Cheng | ................... | G06F 3/0428 |
| 2005/0123242 A1* | 6/2005 | Walker | ................. | G02F 1/2257 385/40 |
| 2010/0127611 A1* | 5/2010 | Imura | ..................... | C23C 14/08 313/326 |
| 2010/0156848 A1* | 6/2010 | Yatsuda | ........... | B29D 11/00663 345/175 |

(Continued)

FOREIGN PATENT DOCUMENTS

JP       2002031794 A      1/2002

OTHER PUBLICATIONS

Kang, L. et al., "An active metamaterial platform for chiral responsive optoelectronics", Advanced Materials 27, 2015.

(Continued)

*Primary Examiner* — Ellen E Kim
(74) *Attorney, Agent, or Firm* — Dinsmore & Shohl LLP (57) ABSTRACT

A display includes a plurality of elongated waveguides positioned adjacent to each other and extending along a first direction, a plurality of elongated upper electrodes positioned adjacent to each other on a first side of the waveguides and extending along the first direction, and a plurality of elongated lower electrodes positioned adjacent to each other on a second side of the waveguides opposite the first side and extending along a second direction transverse to the first direction. At least one of the waveguides comprises nonlinear materials having a third order susceptibility.

20 Claims, 8 Drawing Sheets

(56) References Cited

U.S. PATENT DOCUMENTS

| 2013/0044533 A1* | 2/2013 | Wu | G09C 1/00 |
| | | | 365/148 |
| 2017/0329149 A1 | 11/2017 | Fattal | |
| 2018/0011237 A1 | 1/2018 | Fattal | |

OTHER PUBLICATIONS

Chen, S. et al, "Gigantic electric-field-induced second harmonic generation from an organic conjugated polymer enhanced by a band-edge effect", Light: Science & Applications 8:17, 2019.

Kang, L. et al., "Electrifying photonic metamaterials for tunable nonlinear optics", Nature Communications 5:4680, Aug. 11, 2014.

Lan, S. et al., "Backward phase-matching for nonlinear optical generation in negative-index materials", Nature Materials, vol. 14, Aug. 2015.

* cited by examiner

NONLINEAR OPTICS ENABLED TRANSPARENT DISPLAY

TECHNICAL FIELD

The present specification generally relates to an apparatus for displaying visual information and, more specifically, to two-dimensional transparent displays utilizing nonlinear optics.

BACKGROUND

Passive matrix displays are a common type of two-dimensional display. A passive matrix liquid crystal display (LCD) comprises a liquid crystal material positioned between a grid of conductors. One side of the liquid crystal material has a series of conductors arranged in rows and the other side of the liquid crystal material has a series of conductors arranged in columns. Each point where a conductor row and a conductor column cross represents a pixel.

To illuminate a particular pixel, a charge is applied to one particular conductor row while one particular conductor column is grounded. This creates a potential difference between the conductors at the point where the activated row and the activated column intersect, thus causing the liquid crystal to emit light at that pixel.

However, given the materials necessary for creating a passive matrix LCD display, it is difficult for those materials and the resulting display to be transparent. Accordingly, a need exists for alternative systems for creating a transparent display.

SUMMARY

In one embodiment, a display includes a plurality of elongated waveguides positioned adjacent to each other and extending along a first direction, a plurality of elongated upper electrodes positioned adjacent to each other on a first side of the waveguides and extending along the first direction, and a plurality of elongated lower electrodes positioned adjacent to each other on a second side of the waveguides opposite the first side and extending along a second direction transverse to the first direction. At least one of the waveguides comprises nonlinear materials having a third order susceptibility.

In another embodiment, an apparatus includes a plurality of fiber elongated waveguides positioned adjacent to each other and extending in a first direction and a plurality of transparent, flexible electrode pairs extending in a second direction parallel to the first direction and interwoven between the waveguides. Each electrode pair comprises two adjacent electrodes. For each waveguide, one electrode of each electrode pair is positioned on a first side of the waveguide and the other electrode of the electrode pair is positioned on a second side of the waveguide opposite the first side. At least one of the waveguides comprises nonlinear materials having a third order susceptibility.

In another embodiment, a method comprises injecting light into a waveguide of a display to produce a color pixel and applying a potential difference across a pair of electrodes positioned on either side of the waveguide. The display comprises a plurality of elongated waveguides positioned adjacent to each other and extending along a first direction, a plurality of elongated upper electrodes positioned adjacent to each other on a first side of the waveguides and extending along the first direction, and a plurality of elongated lower electrodes positioned adjacent to each other on a second side of the waveguides opposite the first side and extending along a second direction perpendicular to the first direction. At least one of the waveguides comprises nonlinear materials having a third order susceptibility.

These and additional features provided by the embodiments described herein will be more fully understood in view of the following detailed description, in conjunction with the drawings.

BRIEF DESCRIPTION OF THE DRAWINGS

The embodiments set forth in the drawings are illustrative and exemplary in nature and not intended to limit the subject matter defined by the claims. The following detailed description of the illustrative embodiments can be understood when read in conjunction with the following drawings, where like structure is indicated with like reference numerals and in which:

DETAILED DESCRIPTION

Figure 1:
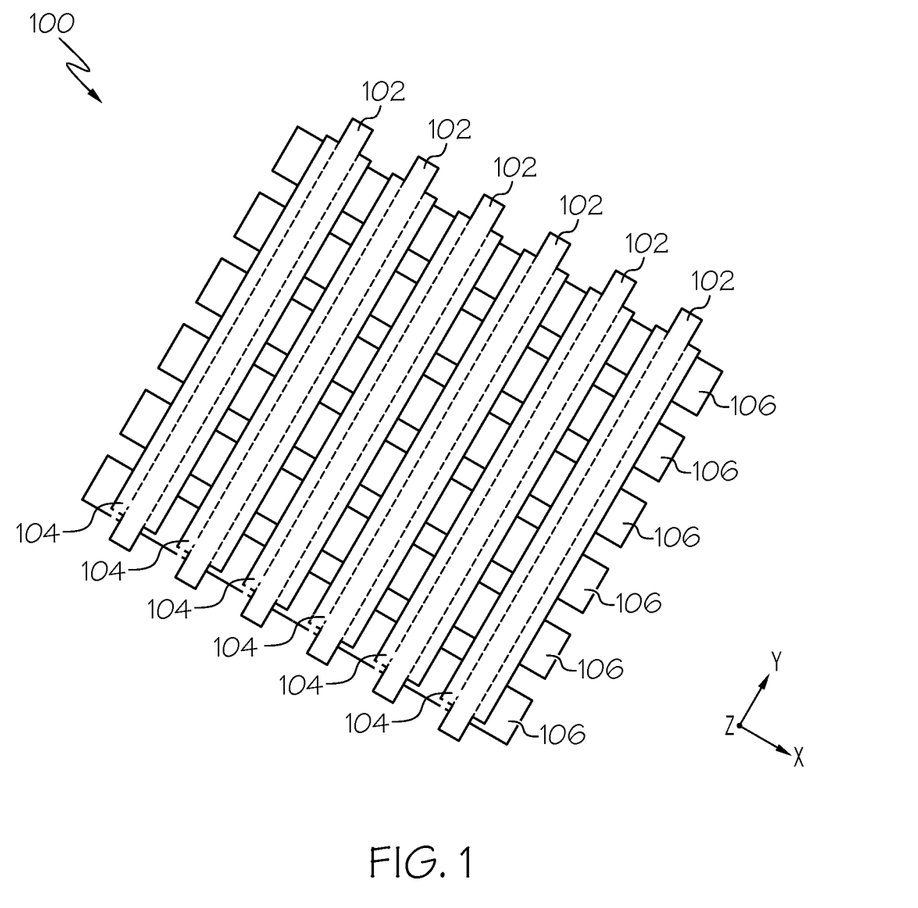
FIG. 1 schematically depicts a view of an example transparent display according to one or more embodiments shown and described herein.

FIG. 1 generally depicts one embodiment of a transparent display. The transparent display of FIG. 1 comprises a passive display matrix comprising a plurality of optical waveguides made of nonlinear materials surrounded on either side by a plurality of transparent electrodes. The electrodes on one side of the waveguides are arranged parallel to the waveguides and the electrodes on the other side of the waveguides are arranged perpendicular to the waveguides. Each point on a waveguide where an electrode on one side of the waveguide crosses an electrode on the other side of the waveguide represents a pixel.

To operate the display, laser light is passed through the waveguides at particular wavelengths. To illuminate a particular pixel, a voltage is applied to one electrode on one side of the waveguides and to one electrode on the other side of the waveguides, thereby creating a potential difference across the waveguide at the point where the two electrodes cross each other. This potential difference across the waveguide interacts with the nonlinear optical waveguide as described herein to cause light to be emitted from the display at the selected pixel.

The example displays disclosed herein utilize a passive matrix display, which may be easily accessed using conventional display systems. The passive matrix allows for control of emission from the display at selected pixels while allowing laser light to continuously pass through the display. The disclosed display also minimizes reflections between stacked materials leading to a more transparent system.

Referring now to FIG. 1, one embodiment of a transparent, two-dimensional display 100 is illustrated. The display 100 generally comprises a plurality of elongated waveguides 102, a plurality of elongated first electrodes 104 positioned on one side of the waveguides 102, and a plurality of elongated second electrodes 106 positioned on the other side of the waveguides 102.

The display 100 comprises a plurality of waveguides 102 arranged adjacent to each other. The waveguides 102 extend along the length of the display 100 (e.g., the y-direction in the orientation of FIG. 1). When light is injected into a waveguide 102, the light travels along the length of the waveguide 102. The waveguides 102 are positioned adjacent to each other along the width of the display 100 (e.g., the x-direction in the orientation of FIG. 1). In the example of FIG. 1, six waveguides 102 are shown for purposes of illustration. However, it should be understood that the display 100 may comprise any number of waveguides 102. In some examples, the number of waveguides 102 is equal to the number of columns of pixels in the display 100. The waveguides 102 have sufficient width such that light may be injected into the waveguides 102.

The waveguides 102 comprise nonlinear materials having a high third-order susceptibility, such as polymers or χ(3) ceramics. The χ(3) waveguides 102 induce a second order harmonic signal when a voltage is applied as described herein. Example materials that produce induced second order harmonic signals include, but are not limited to, alumina oxide, silicon nitride, hafnium oxide, other ceramic oxides, and other polymers such as (poly(9,9-di-n-dodecyl-fuluorenyl-2,7-diyl) PFO film. The crystal orientation of such films should be such that the largest change in the effective second order susceptibility tensor is in the direction of light propagation, thereby maximizing phase matching.

If the waveguides 102 were to comprise nonlinear materials that have a high second-order susceptibility, then light injected into such a waveguide would generate a χ(2) second-harmonic signal without the ability to control which pixels emit a signal. Instead, by using centrosymmetric materials with a high third-order susceptibility and no second-order susceptibility, when light is injected into the waveguides 102 without applying a voltage to any of the electrodes 104, 106, no nonlinear interactions would occur and no induced light signals would be emitted. This allows individual pixels to be controlled by applying voltages to particular electrodes 104, 106 as described herein, which is desirable for a functioning display.

The waveguides 102 are transparent to visible light. In some embodiments, the waveguides 102 comprise a transparent polymer or crystalline thin film that has a third order nonlinear optical tensor. The larger the optical tensor, the stronger the performance of the generated nonlinear optical signal. As used herein, the term transparent means total transmittance of greater than 75%.

Figure 2A:
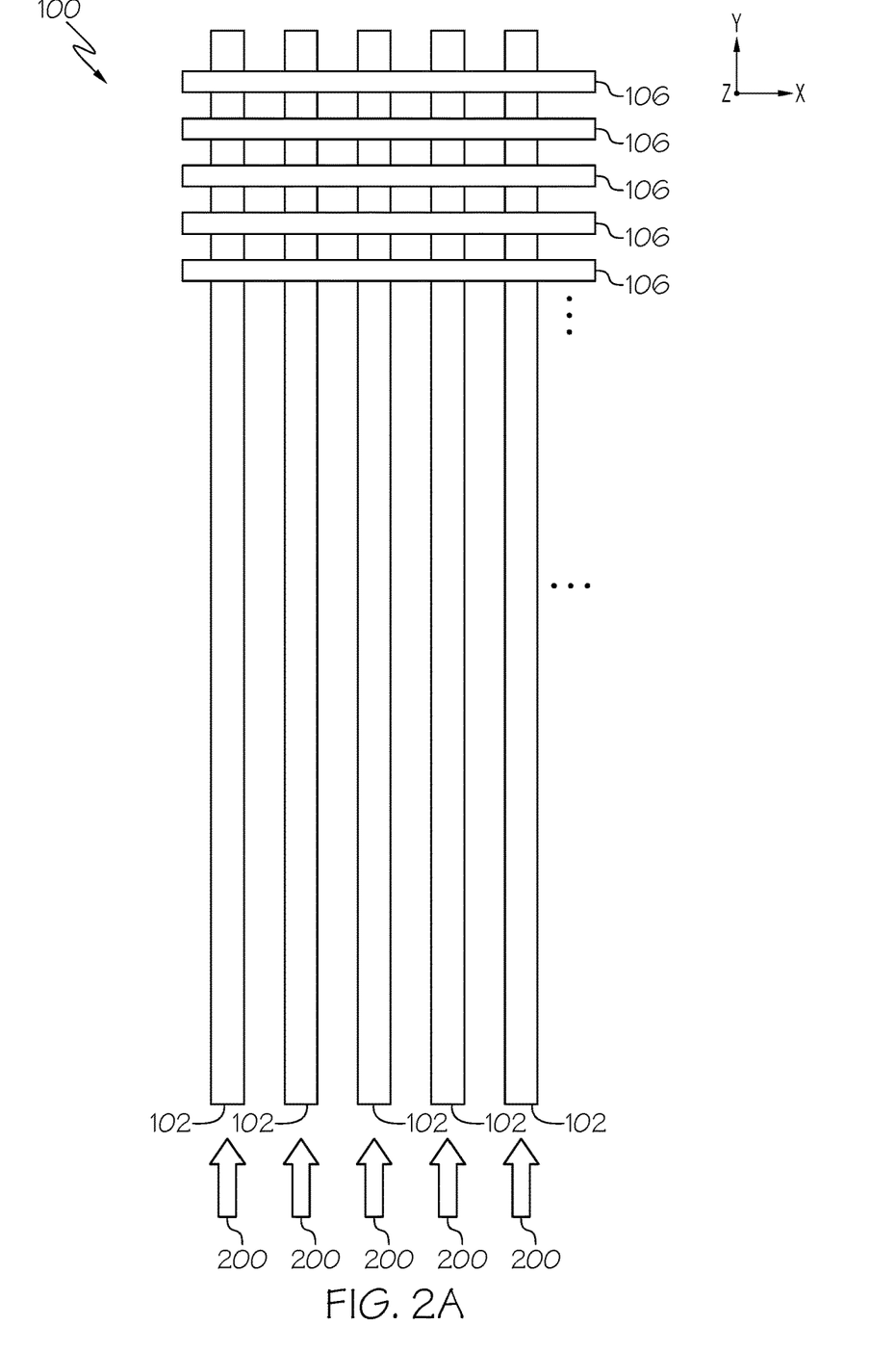
FIG. 2A shows a front view of the example display of FIG. 1.

During operation, light is injected into one or more of the waveguides 102. Referring to FIG. 2A, in some embodiments, a plurality of light sources 200 are used to inject light into the waveguides 102. In the example of FIG. 2A, the number of light sources is equal to the number of waveguides 102.

The light sources 200 inject light into the waveguides 102 that is coherent and phase matched to the nonlinear materials of the waveguides 102 along the length of the waveguides 102. Light at different wavelengths may be injected into the waveguides 102 to produce different colors from the display 100, as explained in further detail below. In some examples, the light sources 200 comprise one or more lasers. In some embodiments, the light sources 200 comprise one or more optical fibers attached to the waveguides 102. An individual light source 200 may be a pulsed laser, a continuous wave laser, or any other type of laser capable of injecting the appropriate light signal into the waveguides 102. In some embodiments, the light source 200 may comprise another type of light source capable of producing coherent light at appropriate wavelengths.

Figure 2B:
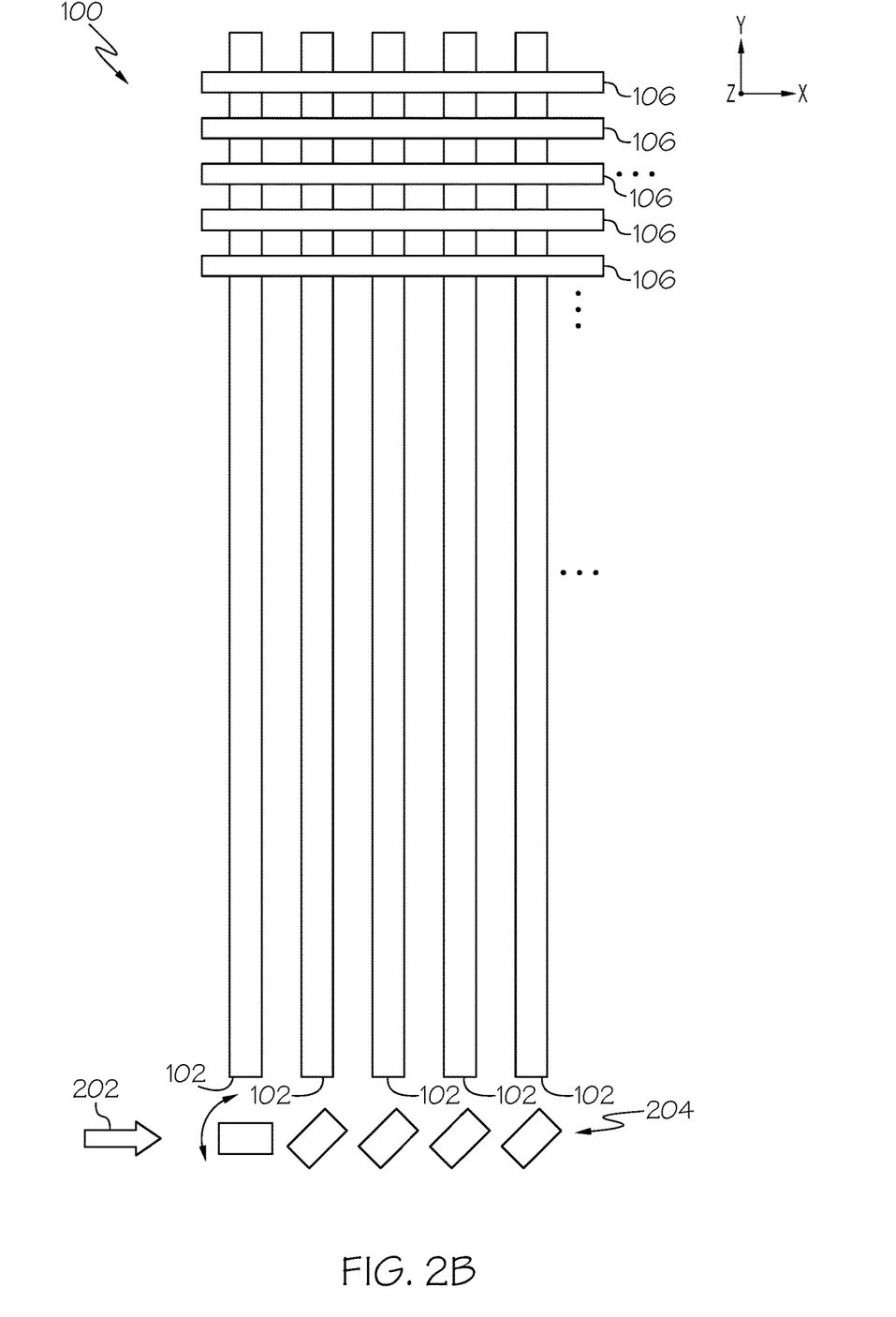
FIG. 2B shows a front view of another example transparent display according to one or more embodiments shown and described herein.

Referring to FIG. 2B, in some embodiments, a single light source (e.g., a laser) is used to inject light into each of the waveguides 102. In the example of FIG. 2B, a single light source 202 emits light to an array of mirrors 204. A light processing unit (not shown) may be used to adjust the mirrors 204 such that light is only injected to selected waveguides 102. The array of mirrors 204 direct light from the light source 202 into the selected one or more waveguides 102.

Figure 3:
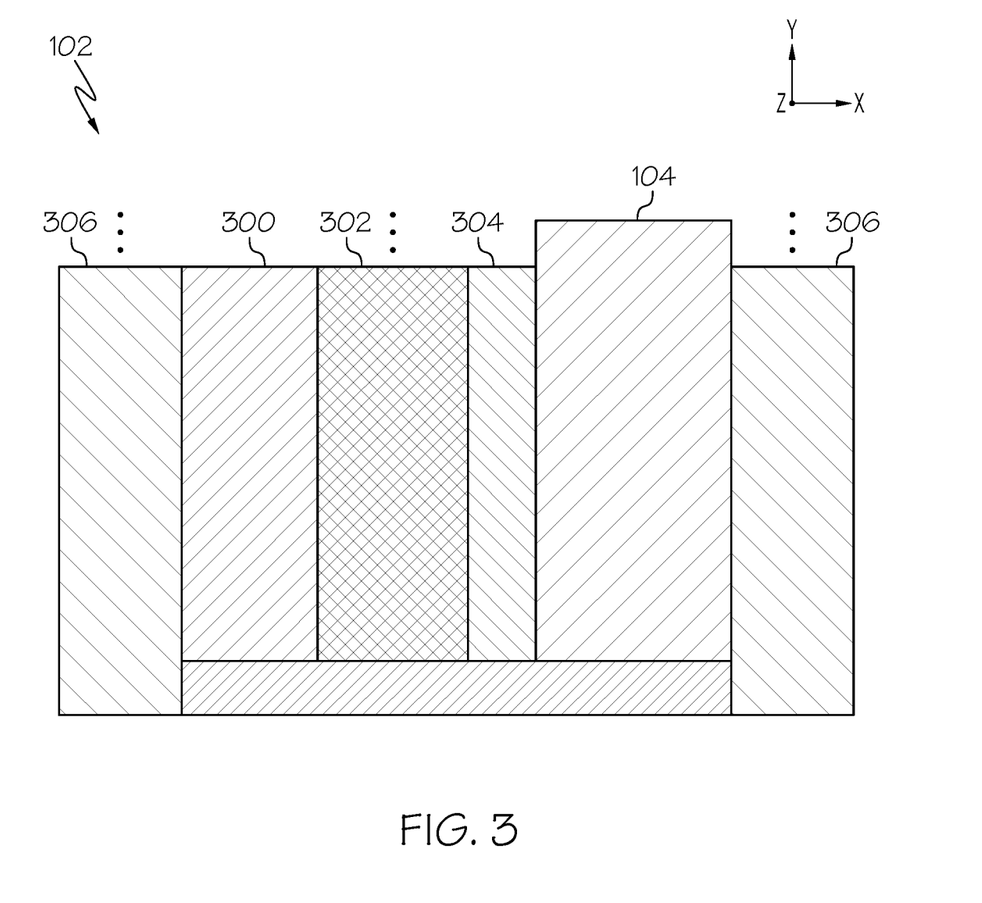
FIG. 3 shows a cross-sectional view of an example waveguide according to one or more embodiments shown and described herein.

Referring to the non-limiting example of FIG. 3, each waveguide 102 may comprise three adjacent sections 300, 302, 304. The three sections 300, 302, 304 each comprise different nonlinear materials such that they have different nonlinear properties. Specifically, the sections 300, 302, 304 each have different a different third-order susceptibility tensor such that each section corresponds to a different color (e.g., red, green, and blue). This allows for the display 100 to be a color display. The wavelength of light injected into the waveguides 102 may be adjusted to change the color of light emitted by a pixel, as explained in further detail below.

In some embodiments, a cladding layer 306 is positioned on either side of each of the waveguide 102. In these embodiments, the cladding layer 306 has a refractive index that is lower than the refractive index of the nonlinear materials of the waveguides 102 such that light injected within a waveguide 102 remains within the waveguide 102. In some examples, the cladding layer 306 comprises silica.

Referring back to FIG. 1, the display 100 comprises two sets of electrodes 104, 106 positioned on either side of the waveguides 102. An upper set of electrodes 104 are positioned above the waveguides 102 in the orientation of FIG. 1 and a lower set of electrodes 106 are positioned below the waveguides 102 in the orientation of FIG. 1. The upper electrodes 104 extend parallel to the waveguides 102 (e.g., along the y-direction in the orientation of FIG. 1) and the lower electrodes 106 extend perpendicular to the waveguides 102 (e.g., along the x-direction in the orientation of FIG. 1). In other embodiments, the upper electrodes 104 may extend perpendicular to the waveguides 102 and the lower electrodes 106 may extend parallel to the waveguides 102.

In the example of FIG. 1, six upper electrodes 104 and six lower electrodes 106 are shown for purposes of illustration. However, it should be understood that the display 100 may comprise any number of upper and lower electrodes 104, 106. The number of upper electrodes 104 multiplied by the number of lower electrodes 106 corresponds to the number of pixels in the display 100.

The upper electrodes 104 are positioned adjacent to each other along the width of the display 100 (along the x-direction in the orientation of FIG. 1) and the lower electrodes 106 are positioned adjacent to each other along the length of the display 100 (along the y-direction in the orientation of FIG. 1). The electrodes 104, 106 are transparent to electromagnetic radiation in the visible spectrum such that a viewer can see through the electrodes 104, 106. In some embodiments, the electrodes 104, 106 are comprised of indium tin oxide. In other embodiments, the electrodes 104, 106 are comprised of conductive electronic polymeric films.

The upper electrodes 104 and the lower electrodes 106 form a grid pattern with the upper electrodes 104 corresponding to pixel rows and the lower electrodes 106 corresponding to columns of pixels. Each location where an upper electrode 104 crosses a lower electrode 106 corresponds to a single pixel. Thus, to turn on a particular pixel and emit light from that pixel, a voltage is applied to the appropriate upper electrode 104 and lower electrode 106 such that a potential difference is created across the waveguide 102 at the location of a selected pixel.

In some embodiments, the upper electrodes 104 and/or the lower electrodes 106 have a corrugated surface to induce scattering and guide light emissions from the display 100, as explained in further detail below. In some embodiments, the corrugated surface of the electrodes 104, 106 is a grating structure.

In operation, a pixel of the display 100 is turned on by injecting light into the appropriate waveguide 102 and simultaneously applying a voltage to the appropriate upper electrode 104 and lower electrode 106 to create a potential difference across the waveguide 102 at the appropriate pixel location. In some examples, light is continuously injected into and passed through each of the waveguides 102. In other examples, light is only injected into a particular waveguide 102 when a pixel along that waveguide is to be turned on.

Figure 4:
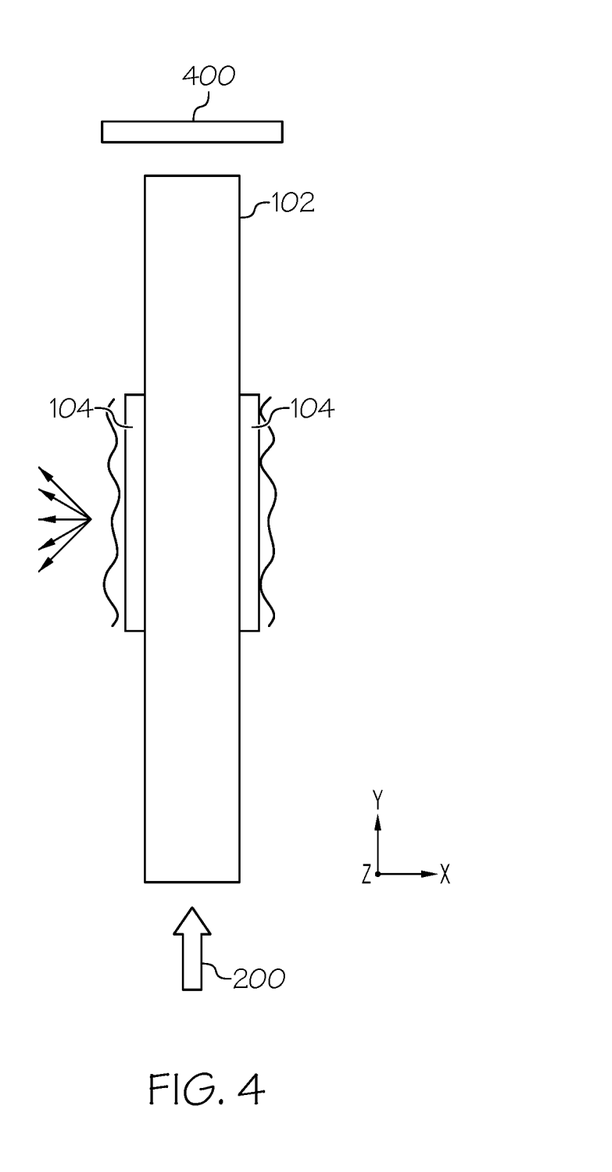
FIG. 4 shows a side view of the example display of FIG. 1.

Referring to FIG. 4, light is injected into a waveguide 102 such that the light travels through the waveguide 102 along its length (e.g., in the y-direction in the orientation of FIG. 4). In some embodiments, a mirror 400 is positioned at the end of the waveguide 102 opposite from the light source 200 such that light that is injected into the waveguide 102 reflects back through the waveguide 102 after is passes through the waveguide 102.

When a voltage is applied to a selected upper electrode 104 and a selected lower electrode 106, the potential difference between the upper electrode 104 and the lower electrode 106 creates a static electric field at the selected pixel location of the waveguide 102. This static electric field interacts with the $\chi(3)$ nonlinear materials of the waveguide 102 to induce a $\chi(2)$ nonlinear response through a process known as electric-field induced second harmonic generation (EFISH). This induced $\chi(2)$ response causes the emission of light at double the frequency of the injected light. Specifically, as a static electric field is applied to the waveguide 102, the normal component of the third order susceptibility tensor of the waveguide 102 is multiplied by the static field, as shown in the equation below. In thin film structures, a large electric field may be applied across the material with only a modest driving voltage.

$$I_{2\omega} \alpha [[\chi^3 E_{DC} + \chi^2] E_\omega^2]^2$$

This induced frequency doubled light emission initially propagates in the same direction as the injected light. The induced light is coupled out of the waveguide 102 via the corrugated structure of the electrodes 104, 106 in conjunction with the effective refractive index of the induced light. The corrugated structure of the electrodes 104, 106 may be configured such that the induced light is emitted out of the display 100 in a direction transverse to the direction of travel of the injected light (e.g., orthogonal in the z-direction in the orientation of FIG. 4). Thus, a viewer of the display 100 would see the selected pixel illuminate.

In some embodiments, the corrugated structure is on the external side of the electrodes 104, 106 (i.e., the side of the electrodes 104, 106 facing away from the waveguides 102). This ensures that the corrugated structure of the electrodes 104, 106 are not to close to the surface of the waveguides 102, which may induce scattering loss from deferred light from the light source 200. In some embodiments, a diffractive optical element may be used in addition to or instead of a corrugated structure for the electrodes 104, 106 to cause the induced light to be emitted orthogonal to the direction of travel of the injected light signal.

To operate a color display 100, the color of the emitted light may be selected by choosing an input light signal of an appropriate wavelength such that the interaction of the input light and the nonlinear materials produces an induced light signal at the desired wavelength. Because the nonlinear materials of the waveguide 102 produce a frequency doubled signal, the input light should have half the frequency (or twice the wavelength) of the desired output signal. In order to turn on more than one pixel at a time with different colors, the light from the light source 200 may be modulated such as with, for example, a digital light processing unit or an array of mirrors such as array 204.

For example, in some embodiments, the three output colors are blue, with a wavelength between 450-495 nm, green, with a wavelength between 495-570 nm, and red, with a wavelength between 620-750 nm. Thus, the injected light from the light source 200 in this example would have a wavelength between 900-990 nm for a pixel to turn blue, between 990-1140 nm for a pixel to turn green, and between 1240-1500 nm for a pixel to turn red. The light from the light source 200 can modulate between these three wavelengths over time to change the pixel color such that the display 100 can operate with full color. Each section 300, 302, 304 of the waveguides 102 should comprise different nonlinear materials such that the input wavelengths are optimized (e.g., phase-matched) to the third order susceptibility of each section 300, 302, 304 of the waveguides 102. In addition, multiple colors can be injected at the same time to create colors that are combinations of red, green, and/or blue. Alternatively, the display 100 may operate with a single color by always injecting the same color light into the waveguides 102.

In the example of FIG. 2B, the single light source 202 supplies light to each of the waveguides 102 through the mirrors 204, which may be controlled by a light processing unit. As discussed above, the light processing unit may adjust the mirrors 204 such that light from the light source 202 is directed into one or more selected waveguides 102 at any given time. Thus, in the example of FIG. 2B, it is not possible to input light at different wavelengths into one or more waveguides 102 at exactly the same time. Therefore, in order for the display 100 in the example of FIG. 2B to display an image at a particular time comprising more than one color, the wavelength of the light from the light source 202 may be modulated at a rate that is faster than the refresh rate of the human eye (e.g., 60 Hz).

For example, to display an image having a blue pixel in column 4, row 8 of the display 100 and a red pixel in column 4, row 16 of the display 100, the light source 202 may output light having a wavelength to trigger a blue pixel (e.g., a wavelength between 900-990 nm) at a first time t1. Also at time t1, the light processing unit may adjust the array of mirrors 204 such that the light from the light source 202 is transmitted through the waveguide 102 at column 4 and a voltage may be applied across the electrodes 104, 106 at row 8. This will cause the display 100 to emit a blue pixel at column 4, row 8 at a time t1.

Then, at a subsequent time t2, which may be after time t1 by an amount less than the refresh rate of the human eye, the light source 202 may output light having a wavelength to trigger a red pixel (e.g., a wavelength between 1240-1500 nm). Also at time t2, the light processing unit may adjust the array of mirrors 204 (or maintain their position in this example) such that the light from the light source 202 is transmitted through the waveguide 102 at column 4 and a voltage may be applied across the electrodes 104, 106 at row 16. This will cause the display 100 to emit a red pixel at column 4, row 16 at a time t2. Because the difference between the times t1 and t2 is within the refresh rate of the human eye, when the display 100 is viewed, it will appear to the viewer that the blue pixel at column 4, row 8 and the red pixel at column 4, row 16 are illuminated at the same time.

Because each section 300, 302, 304 of the waveguides 102 is phase-matched only to one input wavelength, when light having a particular wavelength is injected into a waveguide 102, only the section to which it is phase-matched to that wavelength will induce a nonlinear signal. Thus, only one color at a time will be output by the display 100 at each pixel. Furthermore, because the input light from the light source 200 for each of the three sections 300, 302, 304 of the waveguides 102 is infrared light, as discussed above, this light is not visible to viewers of the display 100 should it leak out of the waveguides 102. Only the frequency doubled induced light having wavelengths in the visible range of the electromagnetic spectrum will be visible to viewers. In some embodiments, one or more dichroic filters may be positioned on the surface of the waveguides 102 to reflect the injected infrared light.

The intensity of light emitted by a particular pixel of the display 100 may be modulated by adjusting the voltage potential applied to either the upper electrode 104 or the lower electrode 106 for a particular pixel, thereby increasing or decreasing the potential difference across the waveguide. To emit light at particular colors from each pixel of the display 100, a number of pixels may be illuminated within the period of the refresh rate of the human eye. Viewers will not notice changes that happen within this refresh rate period. Instead, viewers will witness all pixels illuminated within a single refresh rate of the eye as though they were all illuminated at the same instant.

Figure 5:
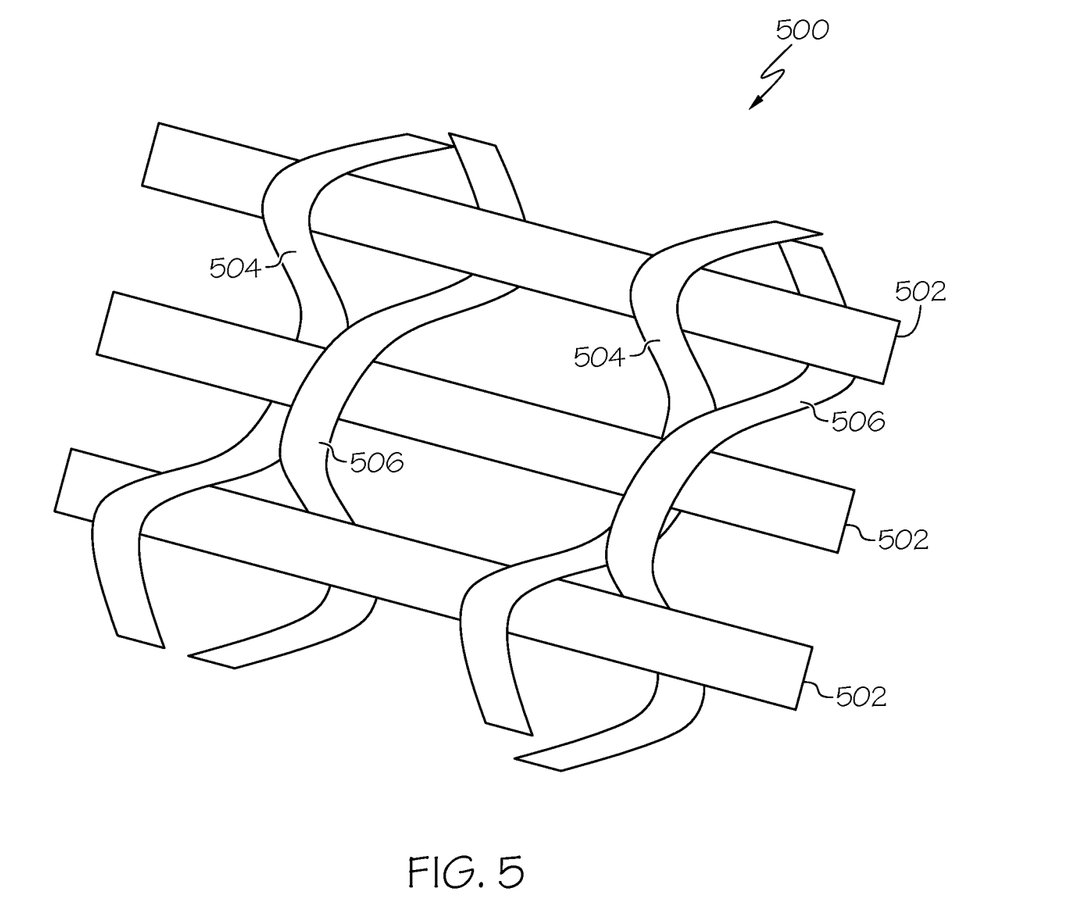
FIG. 5 shows another example transparent display according to one or more embodiments shown and described herein.

FIG. 5 shows another embodiment of a transparent display 500. The display 500 comprises a plurality of polymer fiber optic waveguides 502 and a plurality of electrically conductive, flexible electrodes 504, 506 arranged in pairs. Thus, the display 500 may be a flexible fabric display integrated into furniture, vehicle seats, clothing, or other fabrics. In the example of FIG. 5, three waveguides 502 are shown along with two electrodes 504 and two electrodes 506 for illustrative purposes. However, it should be understood that the display 500 may comprise any number of waveguides and electrodes.

Referring to FIG. 5, the fiber optic waveguides 502 comprise polymer fiber optic nonlinear materials with a high third order susceptibility, similar to the waveguides 102 of FIGS. 1-4. In some embodiments, the polymer fiber optical components of the waveguides 502 are rigid. In other embodiments, fiber optic cables may be created from flexible polymeric materials. During operation, correlated, phase-matched light is injected into one or more waveguides 502 in a similar manner as discussed above in connection with the display 100. Each of the waveguides 502 may comprise three sections with each section optimized to a different input light wavelength, similar to the sections 300, 302, 304 of the waveguides 102. Thus, the wavelength of light injected into the waveguides 502 determines the color emitted by the waveguides 502.

The flexible electrodes 504, 506 are interwoven around the waveguides 502. That is, the electrodes 504, 506 are positioned above one waveguide 502 and below the two adjacent waveguides 502 in an alternating weaving pattern. The electrodes 504, 506 of each pair of electrodes are positioned adjacent to each other and are weaved around the waveguides 502 in a complimentary manner. That is, the electrode 504 of a pair of electrodes is positioned above a particular waveguide 502 while the electrode 506 of the electrode pair is positioned below the same waveguide 502. The electrode 504 is then positioned below an adjacent waveguide 502 while the adjacent electrode 506 is positioned above that waveguide 502. In this manner, the electrodes 504, 506 create a grid of pixels for the display 500.

In operation, light at an appropriate wavelength may be injected into one or more flexible waveguides 502 while a voltage is applied to appropriate electrodes 504, 506. This causes the display 500 to emit light of particular colors at selected pixel locations in a similar manner as discussed above in connection with the display 100 of FIGS. 1-4.

Figure 6A:
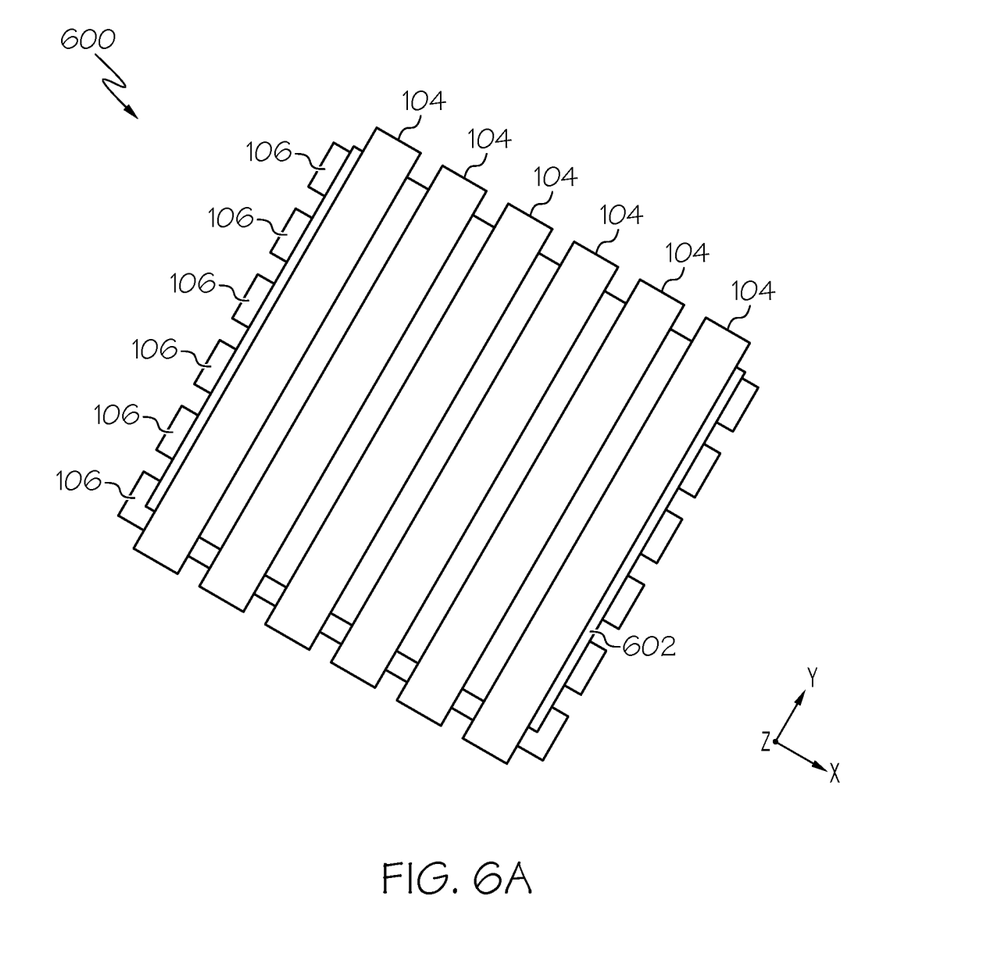
FIG. 6A shows another example transparent display according to one or more embodiments shown and described herein.

FIG. 6A shows another embodiment of a transparent display 600. The display 600 is similar to the display 100 of FIG. 1, except that instead of the plurality of waveguides 102 of display 100, the display 600 of FIG. 6A comprises a single sheet of glass 602 that operates as a waveguide. In some embodiments, the waveguide 602 may comprise an automobile windshield. The display 600 may comprise transparent electrodes 104, 106 overlaid on either side of the glass waveguide 602 in a similar manner as with the display 100.

Figure 6B:
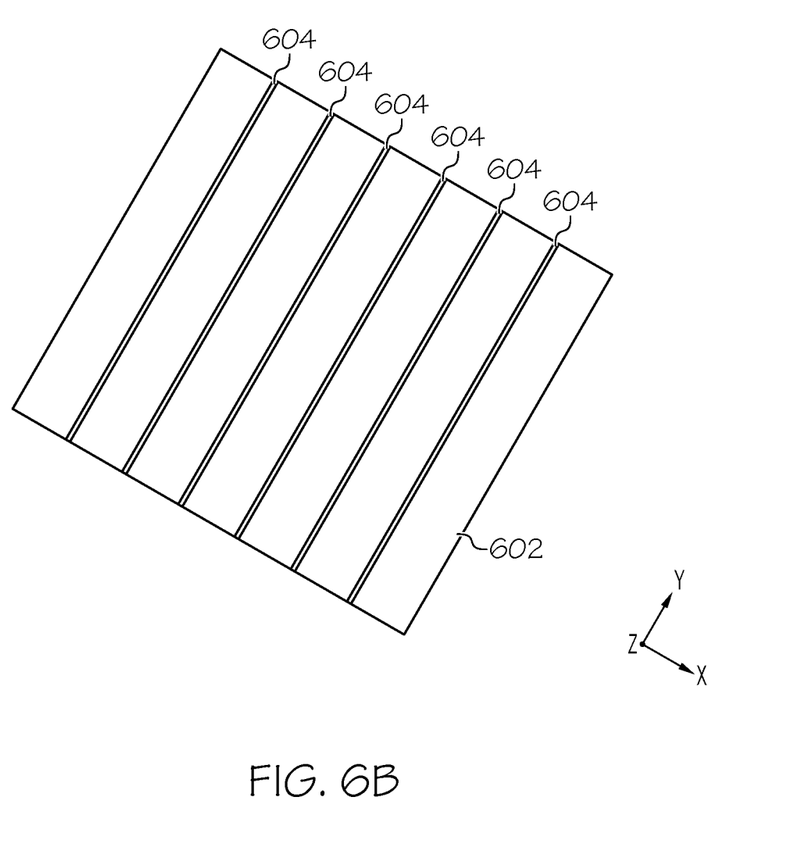
FIG. 6B shows a front view of an example waveguide of FIG. 6A.

In the example of FIG. 6A, the entire sheet of glass 602 has nonlinear properties. Light is injected and guided within the glass 602. Because the display 600 comprises just a single waveguide 602, light should remain parallel to the glass 602 in order to be phase-matched to the nonlinear materials of the waveguide 602. In some embodiments, grooves 604 may be created in the glass 602, as shown in FIG. 6B, wherein the grooves 604 have a different refractive index than the glass 602. The refractive index of the grooves 604 can be chosen such that light injected within a groove 604 stays within that groove 604 by the process of total internal reflection. In this manner, each groove 604 acts as a channel or individual waveguide within the glass 602, wherein the pixels of the display 600 comprise points along the grooves 604 where the electrodes 104, 106 cross over each other.

The display 600 may operate in a similar manner as the display 100 where pixels are turned on by injecting light at particular wavelengths into particular grooves 604 of the glass 602 and creating a potential difference across the electrodes 104, 106 at particular pixel locations to emit light from the pixels with certain colors. In this manner, the display 600 can be embedded within, for example, a window or windshield of a vehicle.

It is noted that the terms "substantially" and "about" may be utilized herein to represent the inherent degree of uncertainty that may be attributed to any quantitative comparison, value, measurement, or other representation. These terms are also utilized herein to represent the degree by which a quantitative representation may vary from a stated reference without resulting in a change in the basic function of the subject matter at issue. It is noted that the terms "upper" and "lower" are utilized herein for convenience of illustration but these terms do not mean an intended direction.

While particular embodiments have been illustrated and described herein, it should be understood that various other changes and modifications may be made without departing from the spirit and scope of the claimed subject matter. Moreover, although various aspects of the claimed subject matter have been described herein, such aspects need not be utilized in combination. It is therefore intended that the appended claims cover all such changes and modifications that are within the scope of the claimed subject matter.

The invention claimed is:

1. A display comprising:
    a plurality of elongated waveguides positioned adjacent to each other and extending along a first direction;
    a plurality of elongated upper electrodes positioned adjacent to each other on a first side of the waveguides and extending along the first direction; and
    a plurality of elongated lower electrodes positioned adjacent to each other on a second side of the waveguides opposite the first side and extending along a second direction transverse to the first direction;
    wherein at least one of the waveguides comprises nonlinear materials having a third order susceptibility.

2. The display of claim 1, further comprising a light source to inject light into one or more of the waveguides.

3. The display of claim 1, wherein the upper electrodes and the lower electrodes are transparent to visible light.

4. The display of claim 1, wherein the waveguides are transparent to visible light.

5. The display of claim 1, wherein the upper electrodes and the lower electrodes define a grid of pixels at points along the waveguides where an upper electrode crosses over a lower electrode.

6. The display of claim 5, wherein the nonlinear materials are selected such that a potential difference across a pixel on a waveguide when light is injected into the waveguide causes a second order harmonic signal to be induced such that light is emitted from the waveguide at the location of the pixel.

7. The display of claim 6, wherein the induced light emitted from the waveguide has a frequency that is twice the frequency of the light injected into the waveguide.

8. The display of claim 6, wherein the upper electrodes or the lower electrodes comprise a corrugated structure configured such that induced light emitted from the waveguide travels in a direction orthogonal to the direction of the light injected into the waveguide.

9. The display of claim 6, wherein at least one waveguide comprises three adjacent sections each having different nonlinear properties, and wherein each section is phase-matched to a different wavelength of light such that a section of the waveguide only induces a second order harmonic signal when the light injected into the waveguide is phase-matched to that section.

10. The display of claim 9, wherein a first section of the at least one waveguide is optimized to emit red light when light at a first wavelength is injected into the waveguide, a second section of the at least one waveguide is optimized to emit green light when light at a second wavelength is injected into the waveguide, and a third section of the at least one waveguide is optimized to emit blue light when light at a third wavelength is injected into the waveguide.

11. The display of claim 10, wherein the first wavelength is between 1240-1500 nm, the second wavelength is between 990-1140 nm, and the third wavelength is between 900-990 nm.

12. The display of claim 1, wherein the plurality of waveguides comprise a plurality of grooves in a sheet of glass.

13. An apparatus comprising:
    a plurality of fiber elongated waveguides positioned adjacent to each other and extending in a first direction; and
    a plurality of transparent, flexible electrode pairs extending in a second direction parallel to the first direction and interwoven between the waveguides;
    wherein each electrode pair comprises two adjacent electrodes;
    wherein for each waveguide, one electrode of each electrode pair is positioned on a first side of the waveguide and the other electrode of the electrode pair is positioned on a second side of the waveguide opposite the first side; and
    wherein at least one of the waveguides comprises nonlinear materials having a third order susceptibility.

14. The apparatus of claim 13, further comprising a light source to inject light into one or more of the waveguides.

15. The apparatus of claim 13, wherein the nonlinear materials are selected such that a potential difference applied to the electrodes of an electrode pair when light is injected into one of the waveguides causes a second order harmonic signal to be induced such that light is emitted from the waveguide at a point along the waveguide positioned between the two electrodes of the electrode pair.

16. The apparatus of claim 15, wherein the induced light emitted from the waveguide has a frequency that is twice the frequency of the light injected into the waveguide.

17. The apparatus of claim 16, wherein at least one waveguide comprises three adjacent sections each having different nonlinear properties, and wherein each section is phase-matched to a different wavelength of light such that a section of the waveguide only induces a second order harmonic signal when the light injected into the waveguide is phase-matched to that section.

18. A method comprising:
    injecting light into a waveguide of a display to produce a color pixel; and
    applying a potential difference across a pair of electrodes positioned on either side of the waveguide;
    wherein, the display comprises:
        a plurality of elongated waveguides positioned adjacent to each other and extending along a first direction;
        a plurality of elongated upper electrodes positioned adjacent to each other on a first side of the waveguides and extending along the first direction; and
        a plurality of elongated lower electrodes positioned adjacent to each other on a second side of the waveguides opposite the first side and extending along a second direction perpendicular to the first direction;
        wherein at least one of the waveguides comprises nonlinear materials having a third order susceptibility.

19. The method of claim 18, wherein the nonlinear materials are selected such that a potential difference across the pair of electrodes causes a second order harmonic signal to be induced such that light is emitted from the waveguide at the location of the pixel.

20. The method of claim 18, wherein at least one waveguide comprises three adjacent sections each having different nonlinear properties, and wherein each section is phase-matched to a different wavelength of light such that a section of the waveguide only induces a second order harmonic signal when the light injected into the waveguide is phase-matched to that section.

\* \* \* \* \*